(12) United States Patent
Yan et al.

(10) Patent No.: US 8,332,527 B2
(45) Date of Patent: Dec. 11, 2012

(54) STREAMING MEDIA NETWORK SYSTEM, STREAMING MEDIA SERVICE REALIZATION METHOD AND STREAMING MEDIA SERVICE ENABLER

(75) Inventors: Jun Yan, Shenzhen (CN); Jincheng Li, Shenzhen (CN); Xiangyang Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 774 days.

(21) Appl. No.: 12/192,968

(22) Filed: Aug. 15, 2008

(65) Prior Publication Data
US 2008/0307108 A1 Dec. 11, 2008

Related U.S. Application Data

(63) Continuation of application No. PCT/CN2007/000556, filed on Feb. 15, 2007.

(30) Foreign Application Priority Data

Feb. 18, 2006 (CN) .......................... 2006 1 0033767

(51) Int. Cl.
*G06F 15/16* (2006.01)
(52) U.S. Cl. ........................................................ 709/231
(58) Field of Classification Search .................. 709/230, 709/231, 232
See application file for complete search history.

(56) References Cited

U.S. PATENT DOCUMENTS

| 7,603,433 B1 * | 10/2009 | Paterik .......................... 709/217 |
| 2003/0204608 A1 | 10/2003 | Isomaki |
| 2004/0037407 A1 | 2/2004 | Gourraud et al. |
| 2004/0184432 A1 | 9/2004 | Gateva et al. |

(Continued)

FOREIGN PATENT DOCUMENTS

CN 1564597 A 1/2005

(Continued)

OTHER PUBLICATIONS

State Intellectual Property Office of the People's Republic of China, Written Opinion of the International Searching Authority in International Patent Application No. PCT/CN2007/000556 (May 31, 2007).

(Continued)

*Primary Examiner* — Larry Donaghue
*Assistant Examiner* — Marshall McLeod
(74) *Attorney, Agent, or Firm* — Leydig, Voit & Mayer, Ltd.

(57) ABSTRACT

The present invention provides an IMS-based streaming media network system comprising: a streaming media service enabler configured to provide streaming media service description information to a user terminal; an application server configured to send a media resource request after the user terminal selects a streaming media service based on the service description information provided by the streaming media service enabler and after receiving a streaming media service request sent from the user terminal, and to provide the user terminal with information on a media resource delivery processing function entity storing streaming media contents after acquiring the information on the media resource delivery processing function entity; and, a media server configured to provide the application server with the information on the media resource delivery processing function entity storing the streaming media contents, based on the media resource request sent from the application server. The present invention addresses the problem of realizing streaming media services on the basis of IMS-based network architecture.

12 Claims, 10 Drawing Sheets

U.S. PATENT DOCUMENTS

| | | | |
|---|---|---|---|
| 2005/0177853 A1* | 8/2005 | Williams et al. | 725/81 |
| 2005/0251825 A1* | 11/2005 | Fukuda et al. | 725/44 |
| 2006/0256130 A1* | 11/2006 | Gonzalez | 345/619 |
| 2008/0043717 A1 | 2/2008 | Bellora et al. | |
| 2008/0247342 A1 | 10/2008 | Gugerell et al. | |

FOREIGN PATENT DOCUMENTS

| | | |
|---|---|---|
| CN | 1735196 A | 2/2006 |
| DE | 10 2004 030 290 A1 | 1/2006 |
| JP | 2002-91843 A | 3/2002 |
| JP | 2002091843 A | 3/2002 |
| JP | 2002-335268 A | 11/2002 |
| JP | 2002335268 A | 11/2002 |
| WO | WO 2005/006709 A1 | 1/2005 |
| WO | WO 2005/029809 A1 | 3/2005 |
| WO | WO 2005/125238 A1 | 12/2005 |

OTHER PUBLICATIONS

State Intellectual Property Office of the People's Republic of China, Examination Report in Chinese Patent Application No. 200610033767.X (Jan. 8, 2010).

"Technical Framework for Streaming Media over IP-based Network (for solicitations of opinions)," issued by the Ministry of Information Industry of the People's Republic of China, 2004H81 (Oct. 2005).

Zhengkun et al., "IMS Technology in NGN," Jiangsu Communication Technology, vol. 21, No. 4 (Aug. 2005).

"Telecommunications and Internet Converged Services and Protocols for Advanced Networking (TISPAN); NGN Functional Architecture Release 1," ETSI ES 282 001 V1.1.1 (Aug. 2005).

"3rd Generation Partnership Project; Technical Specification Group Services and System Aspects; IP Multimedia Subsystem (IMS); Stage 2 (Release 6)," 3GPP TS 23.228 V6.12.0 (Dec. 2005).

"Technical framework for Streaming Media over IP-based network", Oct. 31, 2005, pp. I-15, published by the Ministry of information industry of the People's Republic of China.

State Intellectual Property Office of the People's Republic of China, Examination Report in Chinese Patent Application No. 2007800002005 (Oct. 9, 2009).

State Intellectual Property Office of the People's Republic of China, Examination Report in Chinese Patent Application No. 200610033767.X (Aug. 9, 2010).

Office Action in corresponding Japanese Application No. 2008-554582 (Nov. 22, 2010).

"Digital Cellular Telecommunications System (Phase 2+); Universal Mobile Telecommunications System (UMTS); IP Multimedia Subsystem (IMS); Stage 2 (3GPP IT 23.228 version 6.9.0 Release 6)," ETSI Standards, 3-SA2(V6.9.0): 1-179 (Mar. 2005).

Rejection Decision in corresponding Chinese Application No. 200780000200.5 (Jul. 4, 2011).

Decision of Refusal in corresponding Japanese Application No. 2008-554582 (Mar. 15, 2011).

2nd Office Action in corresponding Chinese Application No. 200780000200.5 (Mar. 3, 2011).

International Search Report in corresponding PCT Application No. PCT/CN2007/000556 (May 31, 2007).

Refusal Decision in corresponding Japanese Application No. 2008-554582 (Mar. 11, 2011).

1st Office Action in corresponding European Patent Application No. 07710975.9 (Sep. 6, 2012).

\* cited by examiner

STREAMING MEDIA NETWORK SYSTEM, STREAMING MEDIA SERVICE REALIZATION METHOD AND STREAMING MEDIA SERVICE ENABLER

CROSS-REFERENCE TO RELATED APPLICATIONS

This application is a continuation of International Patent Application No. PCT/CN2007/000556, filed Feb. 15, 2007, which claims priority to Chinese Patent Application No. 200610033767.X, filed Feb. 18, 2006, each of which is hereby incorporated by reference in its entirety.

FIELD OF THE INVENTION

The present invention relates to a streaming media technology, and particularly, to a realization technology of IMS-based streaming media service.

BACKGROUND

The streaming media service is a new service rapidly developed in recent years and transmits multimedia content data such as video and audio data over a packet switching network with the streaming transmission technology. The principal feature of the streaming transmission technology lies in that continuous video and audio data is placed on a website server after processing, thus a user can watch and listen while downloading, instead of watching and listening after downloading the entire file to a used user terminal.

An internet protocol television (IPTV) service is a typical service in the streaming field. As shown in FIG. 1, the current IPTV network architecture mainly includes:

an operation support system configured to provide functions such as charging, authentication, content management and digital right management;

a service application layer configured to provide preprocessing such as content coding/decoding conversion, compression and encryption, user's service management, generation and downloading of electronic program guide, and network portal and application functions such as Video on Demand (VOD), Television (TV) and advertisement.

[A content/media distribution network includes a central media server (CS), an edge media server (ES) and a server providing media scheduling and distribution control. The content/media distribution network is configured to distribute content resources to an edge media server required by a user to alleviate loads of the streaming media service on network.

A forwarding layer is configured to forward streaming media service flow, request support for multicasting, and provide quality of service (QoS) guarantee.

Although the IPTV network architecture shown in FIG. 1 may implement the streaming media service, because this architecture is an independent service system, it cannot share support systems such as user management, authentication, and charging with other service networks, hence increasing operating cost of carriers.

To meet the increasingly prominent common requirement for IP multimedia applications, the Third Generation Partnership Project (3GPP) introduces an IP Multimedia Subsystem (IMS) of pure IP service network architecture based on the packet forwarding network. The IMS uses packet domain as the forwarding channel for upper layer control signaling and media transmission, introduces a session initiation protocol (SIP) as a service control protocol, utilizes the characteristics of simplicity, ease of extension, convenience in media combination of SIP, and provides rich multimedia services by separating service control and forwarding control.

As shown in FIG. 2, the IMS network architecture includes: P/I/S-CSCF, i.e. call status control function entity, configured to provide relevant functions in the IMS network architecture such as subscriber broker, session control, routing, triggering of services and communication between different IMS domains; MGCF/T-MGF, i.e., media gateway control function, media gateway function and signaling gateway function, configured to implement communication between users in the IMS network architecture and those in traditional Public Switching Telephone Network (PSTN); Bleeding-off gateway control function (BGCF) configured to address and route between MGCFs of different IMS domains; SLF configured to implement choice among a plurality of user profile server function (UPSF); IBCF and I-BGF as function entities for communication between IMS domains; MRF, i.e. media resource function, configured to implement allocation, control and processing on media resources, including media resource function controller (MRFC) and media resource function processor (MRFP); Network attachment subsystem configured to implement access authentication and address assignment for users; Resource access control system configured to control forwarding network according to requirements of service layer such as IMS.

Although the IMS network architecture can share support systems, such as user management, authentication, and charging subsystems with other service networks, at present, the IMS network architecture can only effectively support session services and doesn't have functions necessary to implement streaming media services, such as content management, content protection, and electronic program guide delivery, hence current IMS network architecture can not support streaming media services.

SUMMARY

An object of embodiments of the present invention is to provide an IMS-based streaming media network system, streaming media service realization method and streaming media service enabler to address the problem of realizing streaming media service on the basis of IMS network architecture.

To achieve the above object, the embodiments of the present invention provide an IMS-based streaming media network system comprising: a streaming media service enabler configured to provide streaming media service description information to a user terminal; an application server configured to send a media resource request after the user terminal selects a streaming media service based on the service description information provided by the streaming media service enabler and after receiving a streaming media service request sent from the user terminal, and to provide the user terminal with information on a media resource delivery processing function entity storing streaming media contents after acquiring the information on the media resource delivery processing function entity; and, a media server configured to provide the application server with the information on the media resource delivery processing function entity storing the streaming media contents, based on the media resource request sent from the application server.

The embodiments of the present invention further provide an IMS-based streaming media service enabler including: a service description information storing or acquiring unit configured to store preconfigured service description information or acquire service description information; and, a service description information providing unit configured to provide the service description information to a user terminal.

The embodiments of the present invention further provide an realization method for IMS-based streaming media services including: providing, by an streaming media service enabler, streaming media service description information to a user terminal; selecting, by the user terminal, one streaming media service based on the service description information; transmitting, by an application server, media resource request after the application server receives the streaming media service request from the user terminal; providing, by a media server, information on a media resource delivery processing function entity storing streaming media contents to the application server based on the media resource request; and, providing, by the application server, the information on the media resource delivery processing function entity to the user terminal.

In embodiments of the present invention, the streaming media service enabler may provide service description information to a user terminal, the user terminal may select one streaming media service according to the service description information and transmit a streaming media service request to the application server and the application server then provides information on one media server to the user terminal. Thus, the user terminal may acquire streaming media contents with the information on the media server, thereby achieving the object of realizing streaming media services on the basis of IMS-based network architecture.

DETAILED DESCRIPTION

Embodiments of the present invention will be described in detail below with reference to the accompanying drawings.

Figure 1:
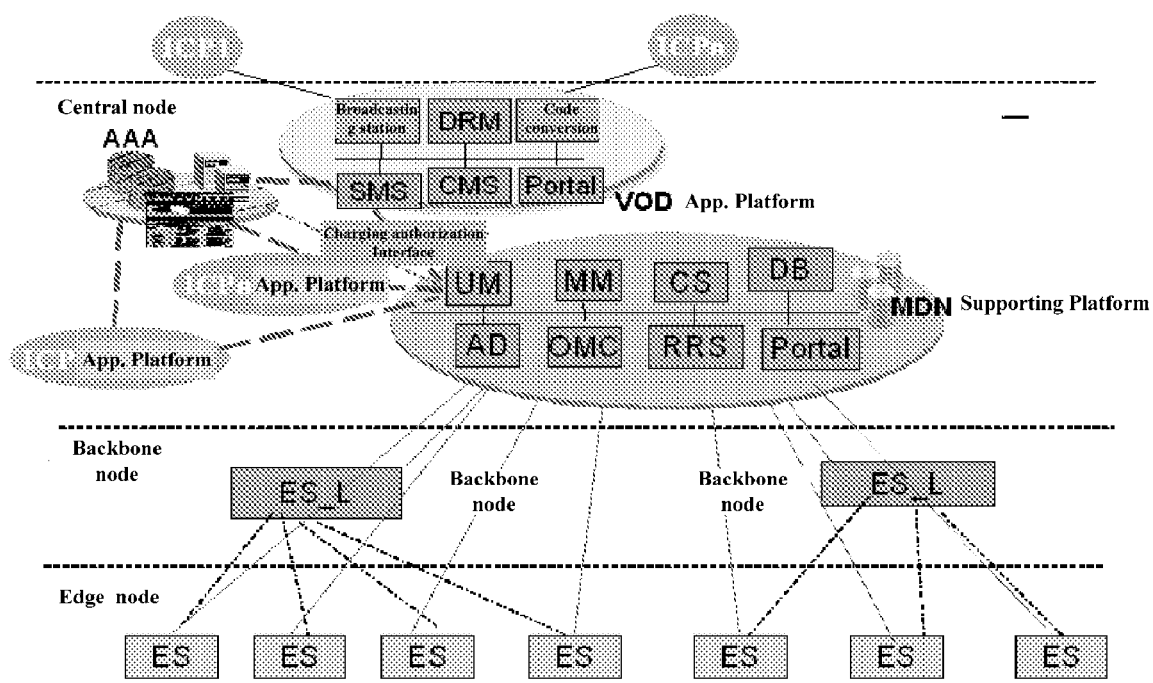
FIG. 1 is a schematic diagram of the existing IPTV network architecture.
Figure 2:
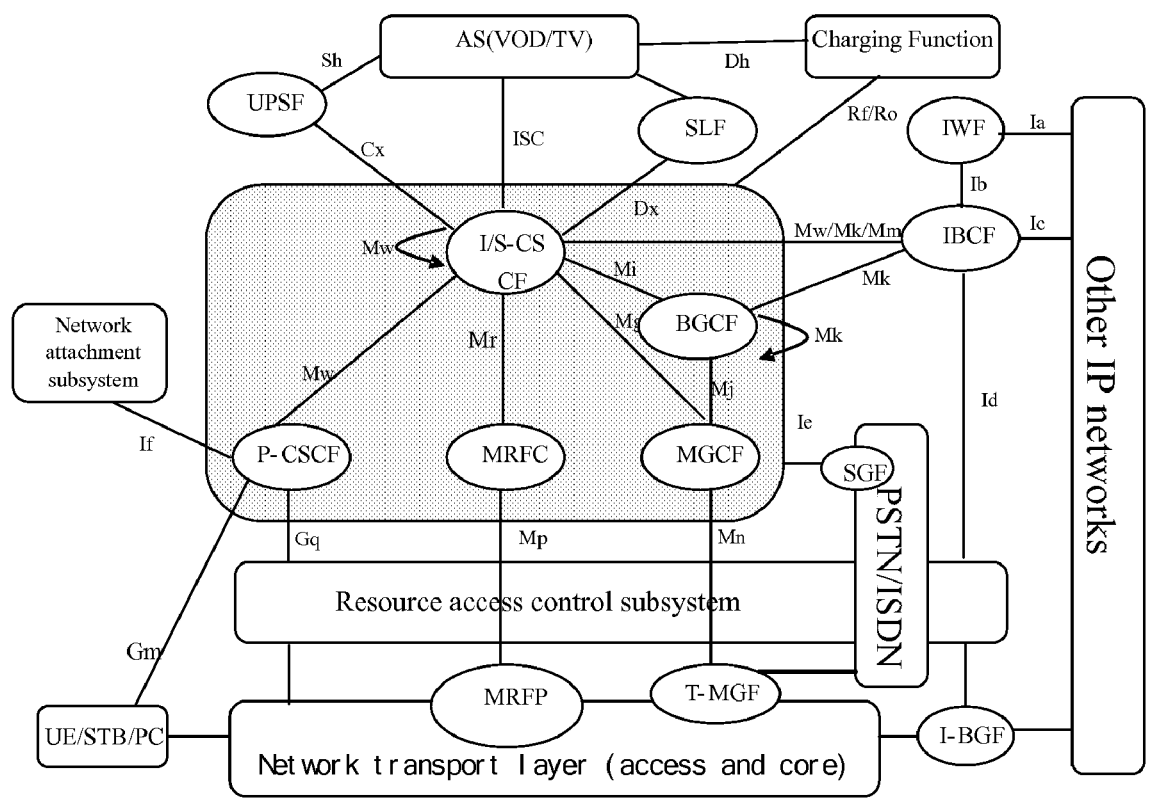
FIG. 2 is a schematic diagram of the existing IMS network architecture.
Figure 3:
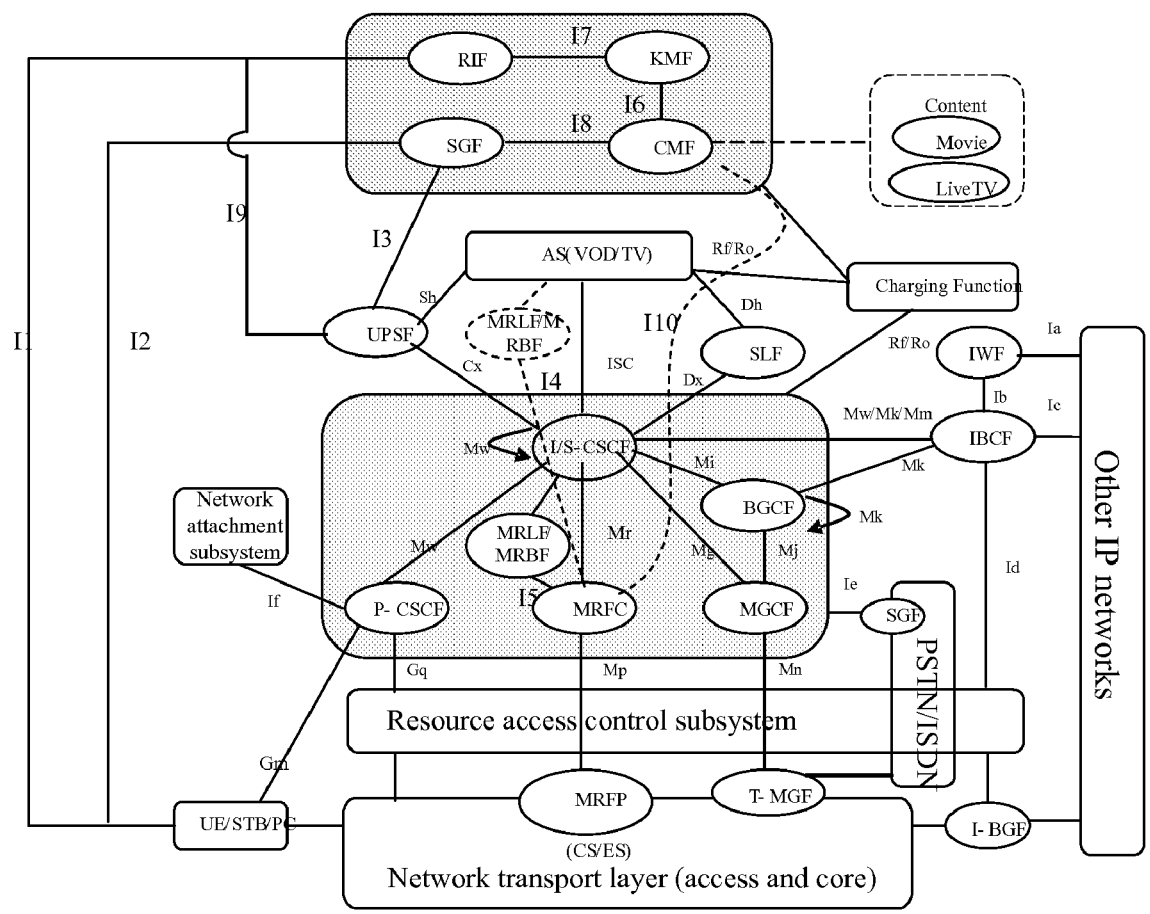
FIG. 3 is a schematic diagram showing the streaming media network system according to a first embodiment of the present invention.

In embodiments of the present invention, by means of characteristics of simplicity, ease of extension and convenience of media combination of SIP, at least one function entity is added on the basis of the existing IMS network system to control the streaming media. As shown in FIG. 3, an IMS network system according to an embodiment of the invention includes P/S/I-CSCF (proxy/service/inquiry-call session control function), MRF (media resource function) and AS (application server), and function entities added in the network system include MRLF/MRBF (Media Resource Location Function/Media Resource Broker Function), SGF (Service Guide Function) entity, CMF (Content Management Function) entity, KMF (Key Management Function) entity and RIF (Right Issue Function) entity.

Description will be given to the above-mentioned function entities and interfaces therebetween.

P/S/I-CSCF provides relevant functions such as session control, routing and service triggering while other function entities provide relevant support functions such as authentication, charging, QoS and security. These function entities cooperate with AS, the former supporting services and the latter providing services. Taking multimedia ring back tone service as an example, AS processes which song the multimedia ring back tone the user subscribed is, how the song is played back and etc., entities other than AS and P/S/I-CSCF process authentication of a user (e.g. whether the user is a valid one), user session establishment (i.e., dial-up) and etc. In addition, MRLF/MRBF processes the location where the subscribed multimedia ring back tone song is stored and how to find an MRF closest to the user, and MRF plays songs for the user.

MRF provides a function of media server in the streaming media network and includes MRFC and MRFP. Depending on the location where MRF is deployed in the network, a central media server or an edge media server may be selected for providing actual media contents. Generally, the edge media server closest to a user is used to provide media contents for the user. However, if the edge media server doesn't have the media contents requested by the user, the media contents requested by user may be provided by the central media server to the edge media server and the latter in turn provides the same for the user. If the user requests the same media contents again, the edge media server may provide the media contents directly for the user.

AS implements logic control over the streaming media service under the support of other function entities in the network system. Specifically, a streaming media session may be established based on established session control mechanism of IMS, or rich services such as integrated real time session service and the streaming media service may be provided by processing different service logics on AS.

MRLF/MRBF, SGF, CMF, KMF and RIF provide streaming media such as copyright management, content information management, electronic program guide generation and streaming media service subscription, or IPTV network specific functions.

MRLF/MRBF provides media resource processing functions, such as collection, searching, locating and distribution of media resource distribution information and MRF status information in this IMS domain or the entire network, and may provide functions of content distribution network (CDN) together with CMF and MRF. MRLF/MRBF may provide media resource distribution or scheduling functions required in the streaming media service and may also provide the same service for a non-streaming media service, such as location of audio and video files and retrieval or distribution of MRF. CDN is an important auxiliary function of the streaming media service. For example, for a large scale streaming media network, when hundreds of thousands of users send simultaneously requests to the streaming media server at center, the network bandwidth can not stand. Therefore, when deploying program contents, it is necessary to distribute hot program contents to the edge media servers close to the users (e.g., Shenzhen) in advance or first distribute hot program contents to the edge media servers close to the users via the central media server (e.g. Beijing) and then the edge media servers distribute the same to the users. If the users request the same program contents again, they may acquire the program contents from the edge media servers directly.

Specifically, MRLF/MRBF may provide the following functions:

Collecting resource distribution information and MRF status information. The MRF status information may be information such as load conditions.

Selecting a suitable MRF according to a request message from AS/S-CSCF, the resource distribution information and the MRF status information and returning the selection result to S-CSCF/AS. The request message from AS/S-CSCF may include information such as media content, user location, OoS and returning the selection result to S-CSCF/AS is a specific function of MRLF.

Routing a media resource request message from AS/S-CSCF to MRF and exiting subsequent message interaction between AS/S-CSCF and MRF according to routing policies. Determining whether to participate in the subsequent messages interaction between AS/S-CSCF and MRF is a specific function of MRBF.

In FIG. 3, MRLF/MRBF may be connected to AS, and also may be connected to S-CSCF. In addition, MRLF/MRBF may be either one, i.e. MRLF/MRBF is either MRLF or MRBF. If it is MRLF, the interface between MRLF and AS/S-CSCF is a query interface through which the selection result of MRF may be returned to AS/S-CSCF; if it is MRBF, the interface between MRBF and AS/S-CSCF is a media resource request message interface. MRBF may route a media resource request message to the selected MRF, and at the same time determine whether to participate in the subsequent message interaction between AS/S-CSCF and MRF. If MRBF does not incorporate its own URI to Record-Route or Route head domain of the media resource request message when routing the media resource request message, then MRBF will not participate the subsequent message interaction.

SGF acquires service description information from business operation support system (BOSS) or other support systems of a carrier and acquires content meta information from CMF. At the same time, SGF may also acquire user profile information from UPSF and generate electronic program guide according to the above information. The service description information is information describing streaming media services such as watching movie and playing game, and the content meta information is information describing content information such as names and contents of movies.

CMF may provide the following functions:

Interacting with a front end to implement media content management function, generating and managing the content meta information.

Interacting with KMF to implement protection function of media content. The protection function may include saving or acquiring of content encryption key.

Interacting with MRF/content system (CS) according to distribution configuration and policy information of carriers to implement distribution of media resources. Content sources provided by original content provider, after are processed by a front end, are stored in CS and contents are then distributed to MRF via CS according to distribution policy configured by the carriers and information collected during subsequent process. The content sources may be streaming media and movie sources or TV programs provided by IPTV content providers.

CMF may also acquire media resource information of media server such as distribution information of media resources and/or media server's load information from function entities, e.g. MRLF/MRBF/MRFC. CMF may also provide these media resource information to other function entities, such as AS, so that other function entities such as AS can inquire media resource information.

KMF may provide the following functions:

Interacting with CMF to store program identification (ID) and corresponding encryption keys. If the contents are protected by encryption, CMF provides the keys to KMF and KMF stores a corresponding relation between the keys and the contents.

Interacting with CMF to generate content protection keys and return the content protection keys to CMF, and storing the corresponding relation between the keys and the contents. If the contents are not encrypted, CMF would request the content encryption keys from KMF, and KMF assigns the keys and returns the keys to CMF, and at the same time KMF stores the corresponding relation between the program ID and the encryption keys.

KMF may also provide the information on the program ID and the keys to RIF.

RIF may provide the following functions:

Interacting with UPSF to acquire profile service and authority information of users and interacting with KMF to acquire key information of media contents requested by the user and then generating user's right object according to above information.

Receiving the request from the user and returning the user's right object. The user may be a user equipment (UE) defined in IMS and may also be other user terminals such as set top box (STB) and personal computer (PC). The interface between the user and RIF may be I1 and the protocol may be right object acquiring protocol (ROAP);

Cooperating with KMF to implement functions of specific digital right management (DRM) module in the streaming media or IPTV. KMF may be incorporated into RIF entity to be merged as one function entity.

It is to be noted that CMF and SGF may cooperate to manage information transmitted by the content sources and generate electronic program guides.

It should also be noted that SGF, KMF, CMF and RIF may be a streaming media service enabler for processing media contents such as coding and decoding conversion, compression and encryption.

Interfaces in FIG. 3 will be described below.

The interface I1 is an interacting interface between the user terminals and RIF through which the user terminals may acquire the right objects, and the protocol of the interface may be ROAP.

The interface I2 is an interacting interface between the user terminals and SGF through which the user terminals may request electronic program guide and subscribe programs, and the protocol of the interface may be HTTP.

The interface I3 is an interacting interface between SGF and UPSF through which SGF may request UPSF for the profile service and authority information of the user and may also store in UPSF program information subscribed by the user, and the protocol of the interface may be Diameter protocol, and the Diameter protocol is a new generation AAA protocol.

The interface I4 is an interacting interface between AS/S-CSCF and MRLF/MRBF through which AS/S-CSCF may request MRLF for a suitable appropriate MRF and may also request MRBF for media resources, and the protocol between AS/S-CSCF and MRLF may be Diameter protocol and the protocol between AS/S-CSCF and MRBF may be SIP.

The interface I5 is an interacting interface between MRLF/MRBF and MRFC through which MRLF/MRBF may exchange the media resource distribution information and the MRFP status information with MRFC and MRLF/MRBF may select appropriate MRF by the exchanging of information.

The interface I6 is an interacting interface between CMF and KMF which may be the interface through which the content protection information is exchanged between CMF and KMF.

The interface I7 is an interacting interface between RIF and KMF through which RIF may request of KMF information on the program ID and the content protection keys.

The interface I8 is an interacting interface between SGF and CMF through which SGF may request of CMF the content meta information.

The interface I9 is an interacting interface between RIF and UPSF through which RIF may request of UPSF the profile service and authority information of the user, and the protocol of the interface may be Diameter protocol.

In FIG. 3, MRLF/MRBF may implement functions of collecting information on MRFs and selecting a suitable MRF. In practical application, functions implemented by MRLF/MRBF may also be implemented by extending functions of MRFC. One of these extending methods is as follows: all MRFCs in the entire network are taken as nodes of a peer-to-peer network with MRFCs implementing functions of peer-to-peer nodes such as management of node member group, authentication, resource issue, search, request and service provision and the function of CDN is completed by interaction between MRFCs. CDN is an important auxiliary function of the streaming media service. For example, for a large scale streaming network, when hundreds of thousands of users send request messages to the streaming server simultaneously, the network bandwidth can not stand. Therefore, when program contents are deployed, hot program contents are necessary to be distribute to edge media servers close to the users (e.g., Shenzhen) in advance or the hot program contents are first distributed to the edge media servers close to the users via the central media server (e.g. Beijing) and are then distributed by the edge media servers to the users. If the users request the same program contents again, the users may acquire the program contents from the edge media servers directly.

Figure 4:
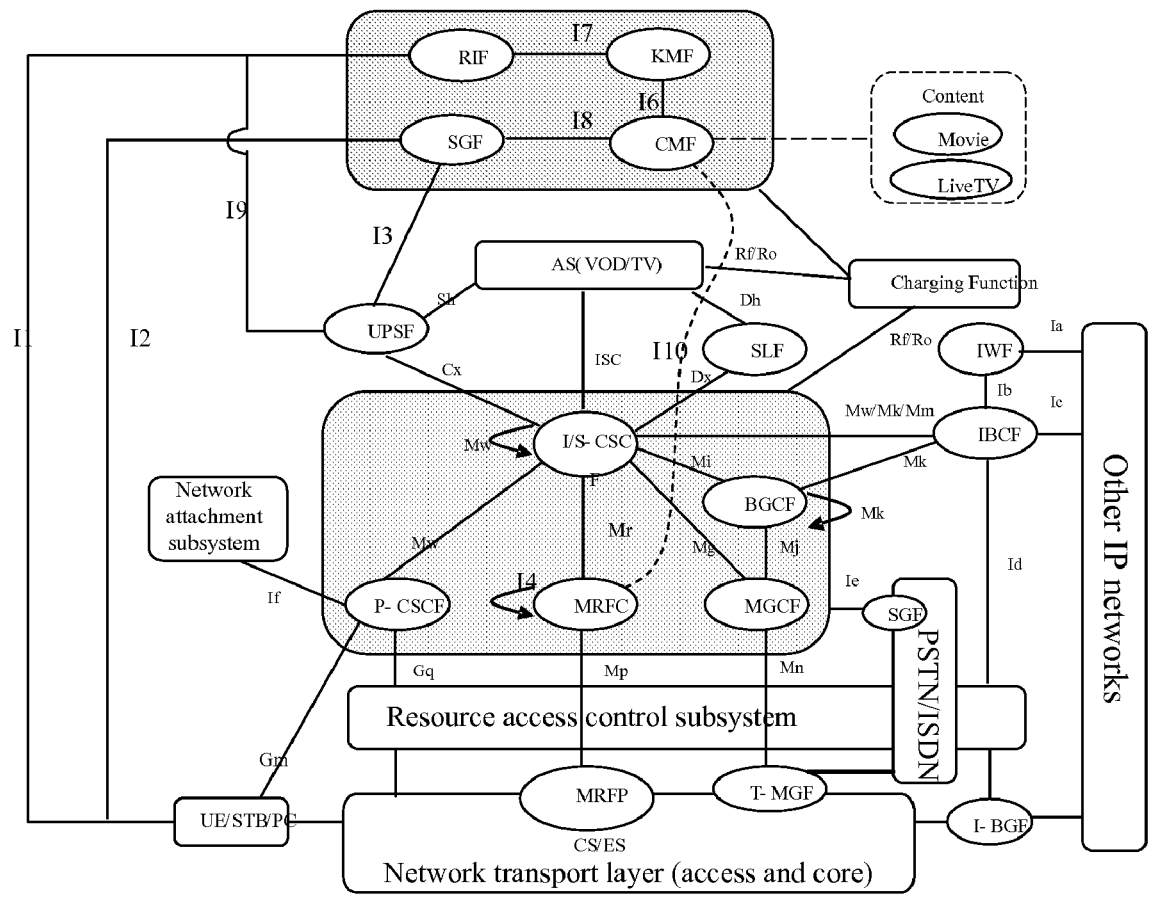
FIG. 4 is a schematic diagram showing the streaming media network system according to a second embodiment of the present invention.

FIG. 4 shows the IMS network system according to a second embodiment of the present invention. As shown in FIG. 4, MRFC implements functions of searching, locating and distributing the media resource distribution information and the MRF status information of the entire network or any of IMS domains. An interacting interface is arranged between MRFC and MRFC. Interaction of media resource distribution information and MRF status information is implemented by interaction between MRFCs in the entire network or any of the IMS domains to acquire the media resource distribution information and the MRF status information of the entire network or any of the IMS domains, whereby enabling AS/S-CSCF to initiate media resources request message to any of the IMS domains and MRFC routes the media resource request message to a suitable MRFC according to the media resource distribution information and the MRF status information acquired by the interaction.

Interaction between MRFCs may be implemented by peer-to-peer (P2P) technology, namely, each MRFC corresponds to one node in the P2P network and functions of distributing and scheduling media resources are implemented on the basis of the P2P technology. The P2P technology may include node member group management, authentication, resource issue, search, request and service provision.

Because MRFC may acquire the media resource distribution information and the MRF status information of the entire network or any of the IMS domains by the interaction between MRFCs, CMF may also acquire the media resource distribution information and the MRF status information of the entire network or any of the IMS domains if it interacts with any of MRFCs and CMF then distribute managed contents to MRF according to configured content distribution policies. CMF may also distribute content sources to a certain MRF and then distribute, according to need, the content sources among MRFs of the entire network or any of the IMS domains based on the P2P network formed among MRFCs. CMF may also constitute the central node of the P2P network directly as an MRFC and distribute, according to need, the content sources among MRFs of the entire network or any of the IMS domains directly according to the distribution technology of the P2P network.

In FIG. 4, when receiving a streaming media service request from the user, AS/S-CSCF may not inquire of MRLF a suitable MRF and instead send a media resource request to an MRFC that may be determined by AS/S-CSCF according to an address of certain configured MRFC or certain universal MRFCs SIP URI and then according to IP address returned to the certain MRFC by resolution policy of DNS. In addition, the media resource request sent by AS may be identical with the streaming media service request, i.e. simply forwarding streaming media service request, and AS may also modify the streaming media service or generate a new request message according to parameters carried by the streaming media service request, and at this time, the media resource request is not identical with the streaming media service request. The MRFC having received the media resource request may route the media resource request to a suitable MRFC according to the information provided by AS such as user location, IP address, user's coding and decoding capability, QoS requirement, user terminal type, media content identification in combination with the media resource distribution information and the MRFC status information of the entire network or any of the IMS domains acquired by the P2P network formed by MRFCs, and the suitable MRFC in turn controls MRFP to provide corresponding media content for the user. MRFC may acquire the media resource distribution information and the MRF status information by interacting with the interface I4 with each MRFC, and control content distribution and scheduling of media resources among different MRFPs.

Figure 5:
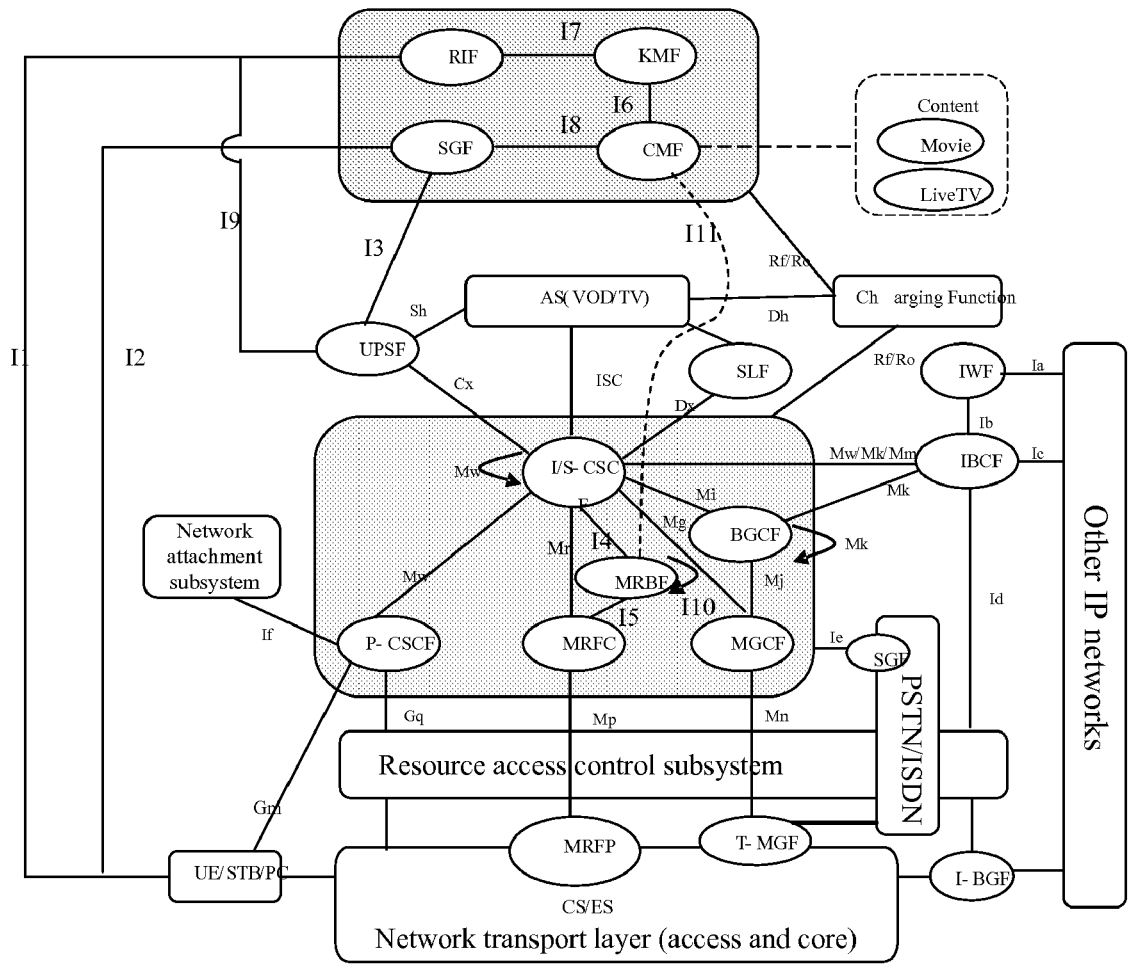
FIG. 5 is a schematic diagram showing the streaming media network system according to a third embodiment of the present invention.

In practical application, MRLF/MRBF may be only one MRBF. FIG. 5 is a diagram showing IMS network system according to a third embodiment of the present invention. As shown in FIG. 5, MRBF, as oriented to media resource broker function, not only implements matching, locating and routing of MRFs in this IMS domain, but also has an additional function of interacting with MRBFs in other IMS domains for cross-domain media resource access.

In addition, there is an interface I10 between MRBF and MRBF for interaction between MRBFs of different IMS domains, and implementing interface functions of searching, locating and routing of cross-domain media resources.

There is an interface I11 between CMF and MRBF for distributing content sources managed by CMF to MRFC via an MRBF. Which MRFC the content sources are distributed to is depended on the MRF status information collected by MRBF and the content distribution policy configured by CMF.

It should be noted that although as shown in FIGS. 3-5, MRLF/MRBF is arranged in IMS network architecture, in practical application, MRLF/MRBF may also be arranged outside of the IMS network architecture as long as there is an interface between MRLF/MRBF and AS/S-CSCF and MRFC.

FIGS. 3-5 show the systems according to three embodiments of the present invention and the present invention further provides an embodiment of realization method of streaming media services based on IMS. The overall technical solution of this method embodiment is as follows: the streaming media service enabler provides the streaming media service description information to the user terminal; the user terminal selects a streaming media service according to the service description information; the application server transmits a media resource request after receiving a streaming media service request from the user terminal; the media server provides information on the media resource delivery processing function entity storing streaming media contents to the application server; the application server provides information on the media resource delivery processing function entity to the user terminal.

The method may further include: before the user terminal initiates the streaming media service request, the user terminal acquires program information from the streaming media service enabler.

The method may further include: when the application server processes the streaming media service request, the application server acquires streaming media content meta information from the streaming media service enabler.

The application server may send the media resource request according to the following steps: the application server inquires of MRLF information on media servers; MRLF selects one media server from at least one media servers and returns information on the selected media server to the application server; the application server sends the media resource request to the selected media server.

The application server may send the media resource request according to the following steps: the application server sends the media resource request to MRBF; MRBF selects one media server from at least one media servers and forwards the media resource request to the selected media server.

The application server may send the media resource request according to the following steps: the application server sends the media resource request to a media resource control function entity in the media server; the media resource control function entity selects one media server from at least one media servers and forwards the media resource request to the selected media server.

The method may further include: after the application server provides the information on the media resource delivery processing function entity to the user terminal, the user terminal and the media resource delivery processing function entity perform delivery negotiation that may include negotiation of description information on media control channel between the media server and the terminal and/or negotiation of description information on media transfer channel between the media server and the terminal and/or negotiation of reservation on network transport layer resources between the media server and the terminal. The media transfer channel refers to a network transport layer carrying channel for transferring streaming media contents such as TCP connection or UDP media stream and the description information on the media transfer channel is relevant parameters characterizing the media transfer channel such as IP address and UDP port number. The media control channel refers to a network transport layer carrying channel that transfers media control signaling such as signaling for controlling transmission of streaming media contents, and the description information on the media control channel is relevant parameters characterizing the media control channel such as IP address, UDP port number. By controlling signaling interacted over the channels, control over transmission of streaming media contents such as start, pause, forward and backward may be implemented. In addition, the user terminal and the media resource delivery processing function entity may perform the delivery negotiation directly or under the control of AS or other function entities.

The method may further include: after the user terminal and the media resource delivery processing function entity perform the delivery negotiation, the user terminal may directly receive streaming media contents provided by the media resource delivery processing function entity, or the user terminal may receive the streaming media contents provided by the media resource delivery processing function entity after the user terminal sends a transfer request to the network transport layer performing the delivery.

The user terminal may further use the right object and/or the key information acquired from the streaming media service enabler to decrypt the streaming media contents.

The delivery negotiation between the user terminal and the media resource delivery processing function entity may include negotiation on description information of media control channel between the media server and the terminal and/or negotiation on description information of media transfer channel between the media server and the terminal and/or negotiation on reservation of network transport layer resource between the media server and the terminal.

Below, by taking VOD as an example again, the description is given to the realization method of streaming media service of the IMS network system according to embodiments of the present invention.

Figure 6:
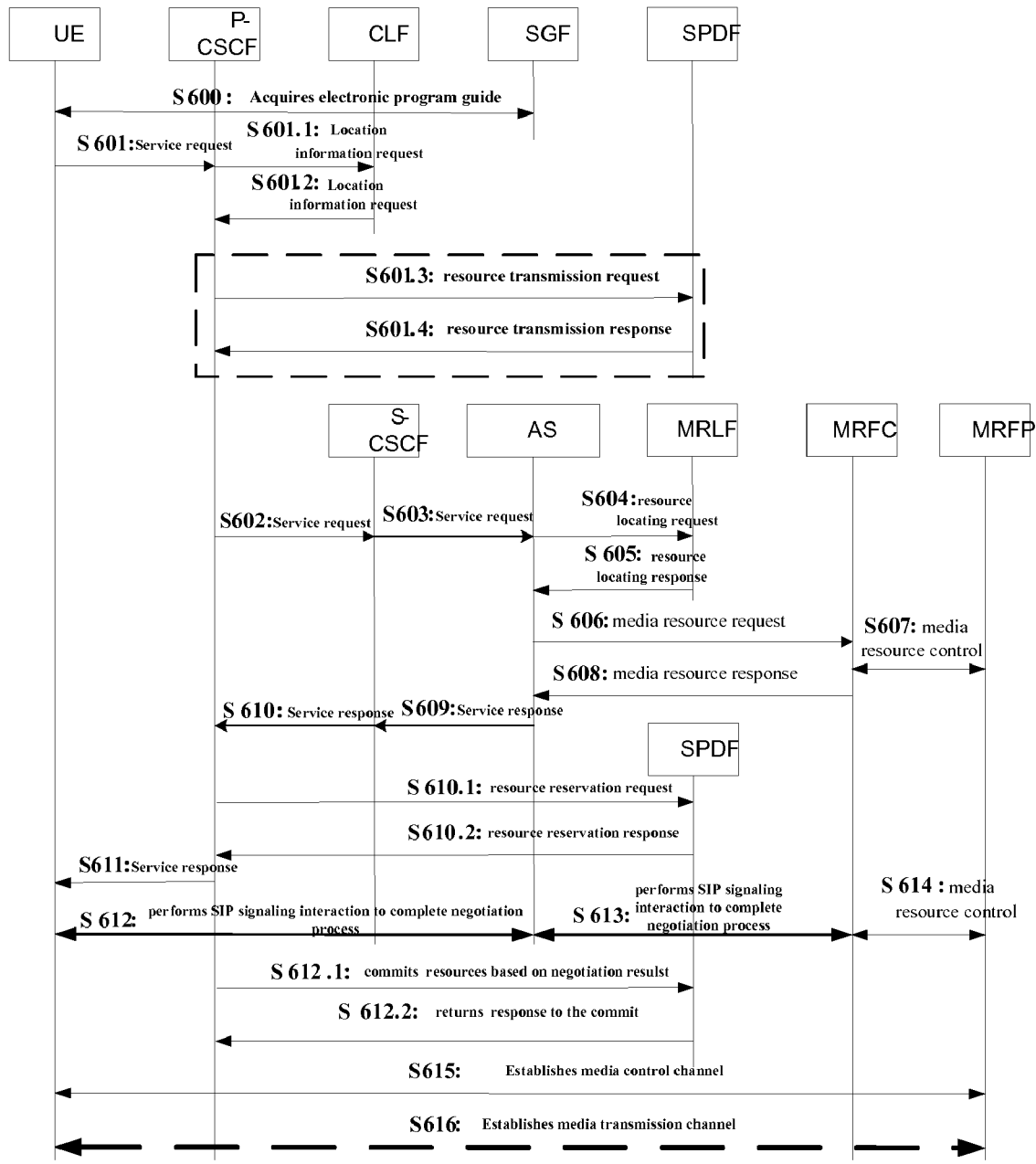
FIG. 6 is a flow chart of the streaming media service realization method according to a first embodiment of the present invention.

First referring to FIG. 6, the method according to a first embodiment is described. In the first embodiment, UE acquires a right object (RO) from RIF via the interface I1 by the content protection mode, to decrypt encrypted contents, as shown in FIG. 6.

S600: UE acquires an electronic program guide from SGF via the interface I2.

S601: UE initiates a service request message based on user resource identification (URI, SIP URI) carried by the electronic program guide and the service request message may be SIP message and includes at least the identification information on the requested content/service. In addition, the service request message may further include AS's URI and relevant media description information (SDP, Session Description Protocol).

S601.1: P-CSCF requests of CLF location information of UE after receiving the service request message. CLF is a function entity in NASS subsystem of NGN network architecture for storing location information of UEs.

S601.2: CLF returns the location information of UE to P-CSCF.

S601.3: Based on SDP included in the service request message sent by UE, P-CSCF may transmit a resource transmission request to SPDF, which is a resource request of the transport layer carrying network. SPDF is a function entity in the RACS subsystem of the NGN network architecture for receiving requests from a service layer and performing control over resources of carrying network together with other function entities of the RACS subsystem. This step may be only one policy decision process for determining whether or not usage of resources is permitted.

S601.4: SPDF returns a resource transmission response to P-CSCF, which includes a feedback processing result.

S602: P-CSCF adds the location information of UE into the service request message and forwards the service request message to S-CSCF.

S603: S-CSCF triggers the service request message to AS processing services/contents based on content and service triggering rules included in the service request message. The triggering conditions may be identifications of the services/contents or URI of AS.

S604: AS performs processing of specific service logics, and if the service request message triggered by S-CSCF involves usage of media contents, it is necessary to determine MRFC available to provide the media resource service. At this point, AS needs to initiate a resource locating request to MRLF, and the resource locating request may include content identification information, content coding format and compression format requirements, location information of UE and identification of UE.

S605: MRLF determines MRF available to provide services based on media resource distribution information and MRF status information acquired by interacting with MRFC in combination with the location information of UE and resource demands, and returns a resource locating response to AS, and the resource locating response includes a return result of the determined MRF.

MRLF may acquire the media resource distribution information and the MRF status information in the following manner:

MRLF, CMF and MRFC interact with each other to control distribution of media resources; MRFC collects the result of the distribution of media resources and supplies the result to MRLF, and after obtaining the distribution of media resources, MRLF may use the distribution of media resources as a condition for selecting MRFC.

In addition, the process of the distribution of media resources may not involve MRLF and the result of the distribution of media resources is provided to MRLF by MRFC.

Moreover, there may be a fixed policy for the distribution of media resources, and the policy may be introduced into MRLF as a basis for selecting MRFC.

S606: AS initiates a media resource request message to MRFC based on address information of MRFC returned from MRLF.

S607: The media resource control MRFC acquires media resource information by interacting with MRFP, and the media resource information includes information such as Realtime Streaming Protocol (RTSP) address/port, Realtime Transfer/Realtime Transfer Control Protocol (RTP/ RTCP) address/port.

S608: MRFC returns SDP of MRFP to AS. SDP includes information such as the determined RTSP/ RTP/ RTCP address/port.

S609: AS returns a service response to S-CSCF.

S610: S-CSCF forwards the service response to P-CSCF. Based on service requirements, e.g., multicasting is required, multicasting control for carrying network may be implemented while reserving QoS resources.

S610.1: P-CSCF initiates a resource reservation request to SPDF.

S610.2: SPDF returns a resource reservation result to P-CSCF.

S611: P-CSCF forwards the service response to UE. The service response includes a media negotiation result.

S612: Based on the service response, UE performs SIP signaling interaction with AS to complete the negotiation process, and When receiving 200 (ok) response returned by AS:

S612.1: P-CSCF modifies and commits SPDF reservation resources based on final negotiation acknowledgement information to open gate control of the carrying network.

S612.2: SPDF returns acknowledgment response to the commit request.

S613: AS and MRFC perform the SIP signaling interaction to complete the negotiation process.

S614: MRFC controls MRFP based on final negotiation result.

S615: The media control channel is established. In this step, UE initiates RTSP connection to MRFP based on the final negotiation result for service stream control, i.e. VCR control.

S616: UE and MRFP establish RTP/RTCP media transmission channel for transmitting media streams.

After receiving media streams, UE decrypts the media streams with the content encryption key included in the right object acquired from RIF and plays the media program. At the same time, UE may exert control, e.g. pausing, speeding and playing back over the media program by the RTSP channel established with MRFP.

Figure 7:
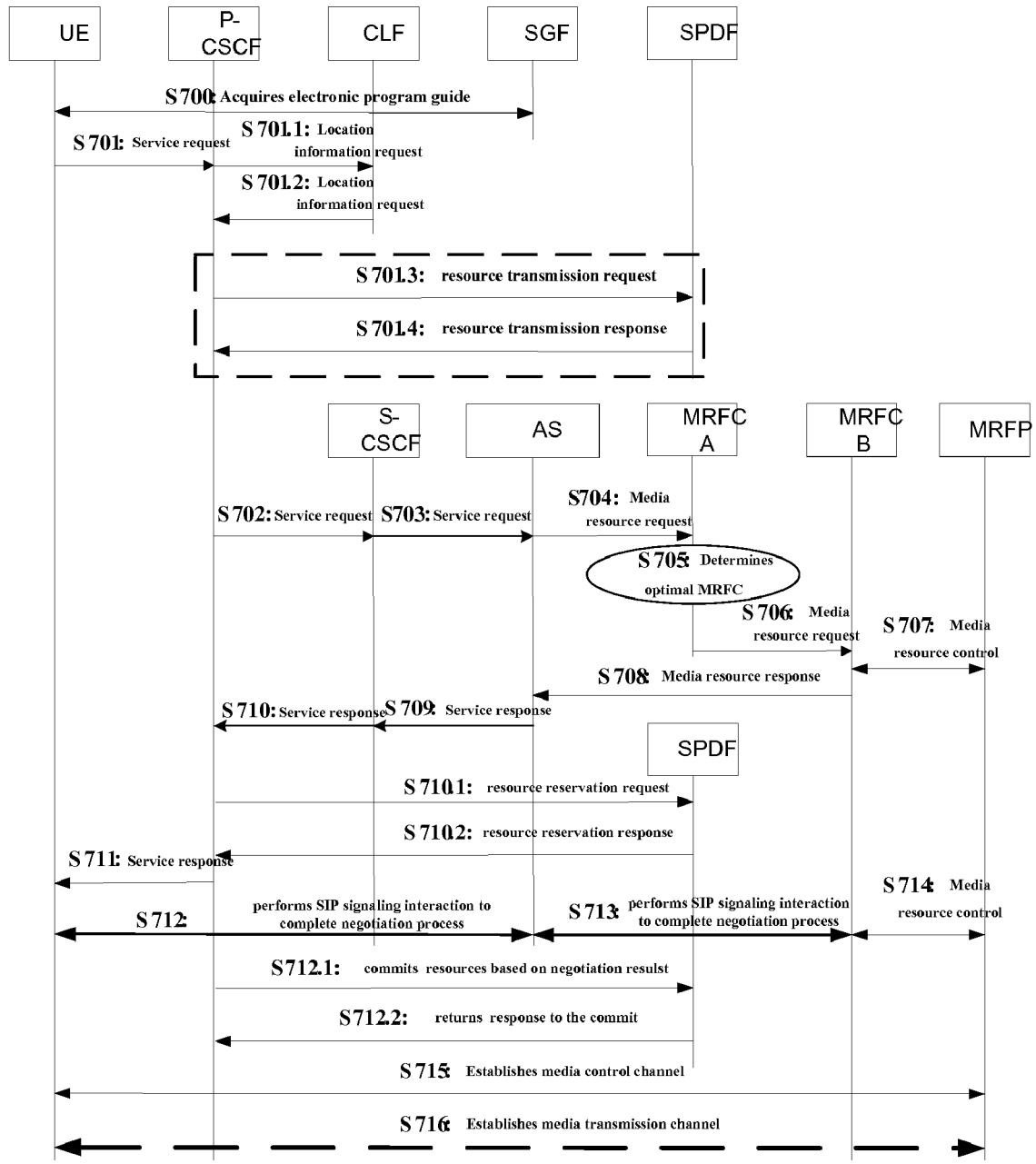
FIG. 7 is a flow chart of the streaming media service realization method according to a second embodiment of the present invention.

FIG. 7 is a flow chart showing the method according to a second embodiment of the present invention. As shown in FIG. 7, in this embodiment, distributing and scheduling of media resources are realized by extending MRF's functions and interaction of the media resource distribution information and the MRF status information is completed to acquire resource information of the entire network by interaction among MRFCs, so that AS/S-CSCF may initiate the resource request to MRFC in any of IMS domains and MRFC routes the media resource request message to a suitable MRFC based on information obtained through the interaction.

Figure 8:
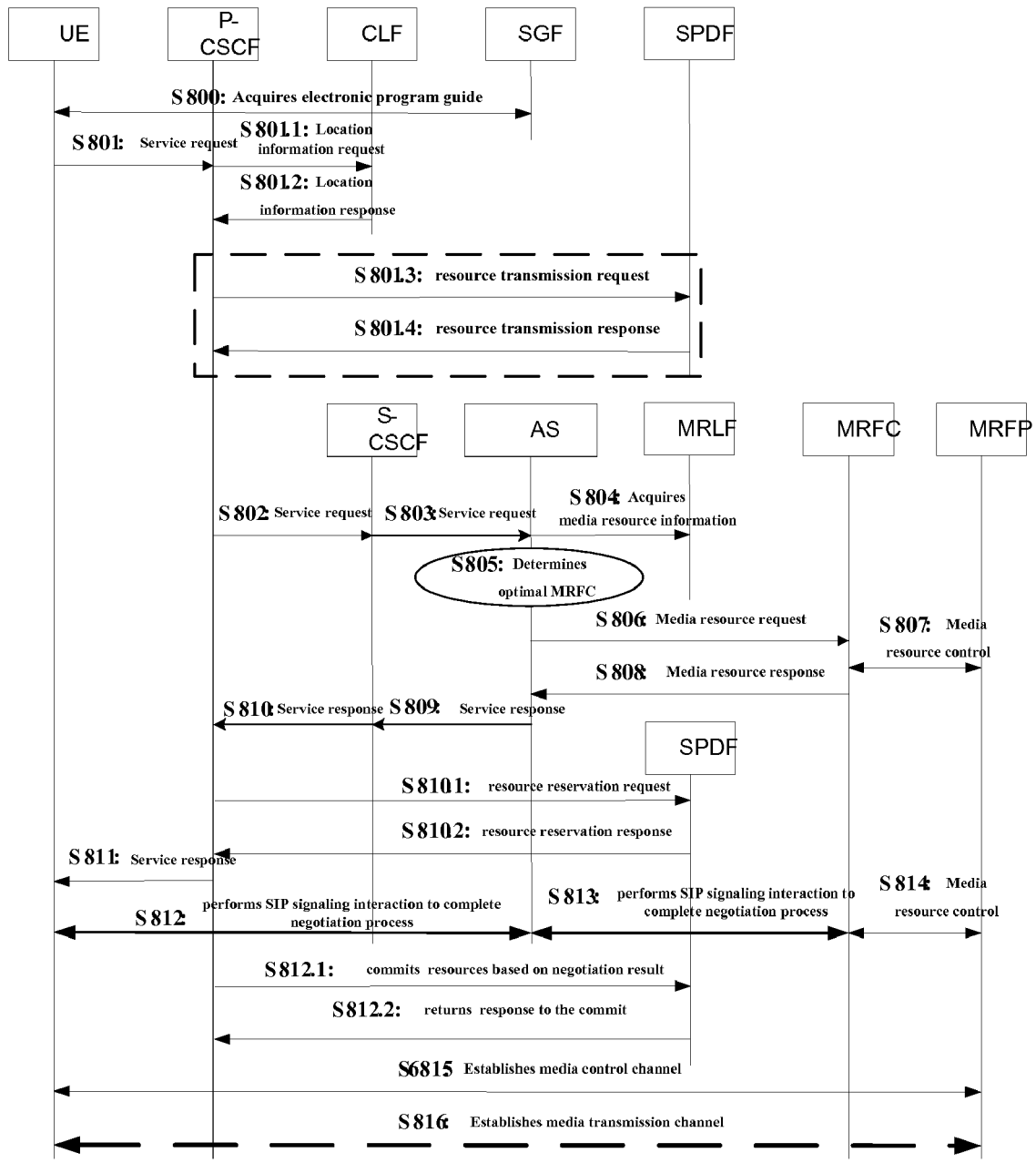
FIG. 8 is a flow chart of a third embodiment of the streaming media service realization method according to the present invention.

FIG. 8 is a flow chart showing the method according to a third embodiment of the present invention. In this embodiment, AS may determine an optimal MRFC, AS may collect or inquire the media resource distribution information and the MRF status information from CMF, MRLF, MRBF or MRFC, and CMF may collect or inquire the media resource distribution information and the MRF status information from MRLF, MRBF or MRFC.

Steps S801-S803 and S806-S816 in FIG. 8 are identical with steps S601-S603 and S606-S616 in FIG. 6; steps S804 and S805 in FIG. 8 are respectively as follows:

S804: Acquiring media resource information.

AS interacts with CMF/MRLF to acquire the media resource information such as media resource distribution information and/or load information of media server.

S805: Determining an optimal MRFC.

The determination is based on the follows: content identification and user location included in the service request message sent from UE and the media resource distribution information and/or the load information of the media server obtained from CMF/MRLF.

It should be noted that in the embodiments of the systems shown in FIGS. 3-5 and the methods shown in FIGS. 6-8, SGF, CMF, KMF and RIF may constitute a streaming media service enabler for providing information such as electronic program guide, content meta information, encryption key and copyright protection. In practical application, the streaming media service enabler may also include other function entities or function units, and the function entities or function units may also provide the information, and of course, other functions or information as well.

If the components of the streaming media service enabler are modified, the streaming media network system in which the streaming media service enabler locates is also modified. Below, embodiments of the streaming media network system are described in conjunction with FIG. 9.

Figure 9:
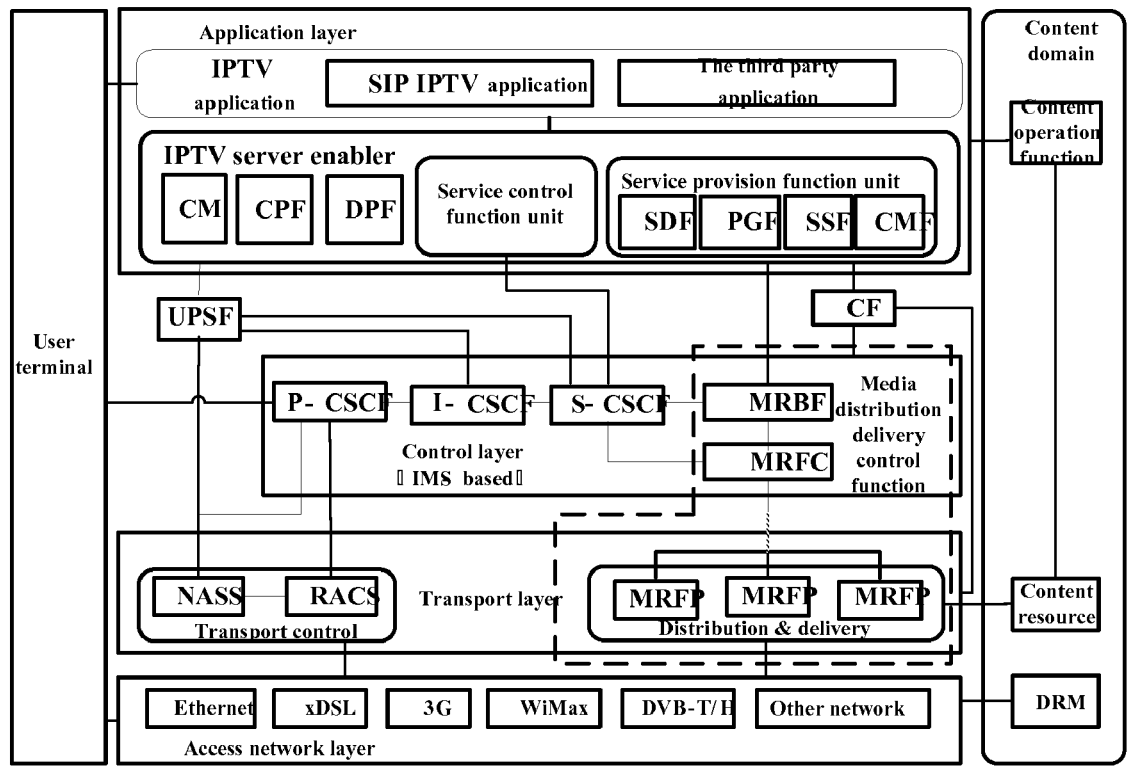
FIG. 9 is a schematic diagram showing the streaming media network system according to a fourth embodiment of the present invention.

As shown in FIG. 9, a content domain includes the following three parts:

A content operation unit.

The content operation unit refers to commands from outside of IMS for managing IPTV service contents, for example, adding a latest movie to the VOD system, establishing a temporary new live broadcast channel for a boxing match or adjusting existing program channels, and the operations therein may be from operation support system or dedicated maintenance operation platform.

A content source.

The content source refers to the source of contents involved in the IPTV services. The contents may be directly from content providers such as live program media streams from satellite network, or be contents stored in certain central server such as a file in film library, or be shared video stream provided by user terminals.

Digit Rights Management (DRM).

DRM refers to external digital right management system. If the contents provided by content providers are encrypted, the user terminal needs to acquire copyright information such as content encryption key, right object provided directly by the content provider through DRM.

The access network layer in FIG. 9 includes wired or wireless access networks capable of supporting IP technology such as Ethernet, Digital Subscriber Line (xDSL), the third generation mobile communication network (3G), wireless local area network (WLAN)/WiMax network, digital video broadcast standard (DVB-T/H) network. Based on characteristics of IPTV services, it is required that the access network has capabilities of supporting unicast/multicast/broadcast to guarantee certain quality of service (QoS). In addition, upper applications should be capable of employing corresponding control mode based on type of the access network. The access network should be able to support NASS and RACS interfaces defined by TISPAN (an international standard organization dedicated to NGN study established earlier).

The transport layer in FIG. 9 may be divided into two parts, i.e., transport control and delivery and distribution.

The transport control directly uses the two function subsystems defined by TISPAN NGN, i.e. NASS and RACS. NASS and RACS are forwarding control layer introduced between IPTV service network and the forwarding network for implementing association between the services and the forwarding. With the cooperation between these two subsystems, the forwarding layer can implement that user terminals are recognizable, the services are distinguishable and the quality is controllable.

NASS may provide access level registration and initialization prior to connecting IPTV service for user terminals, including identification, authentication, IP address assignment and access authorization for devices in the network layer. NASS implements authentication and location of user terminals based on a plurality of policies, whereby lying the foundation for increasing management and security of user terminals, for ensuring consistent service experience for roaming user terminals and for accurate operation of services.

RACS provides requesting and reserving mechanism of network resources for IPTV application. For realtime IPTV services such as live TV (LTV), VOD, video conferencing and online games, resource reservation control, permission control and policy control over the network may be realized by means of RACS. RACS performs resource management and control based on sessions and has independence from services.

In the IPTV services, the entire media delivery distribution control function may be completed by three function entities, i.e., MRBF, MRFC and MRFP. MRBF and MRFC belong to the control layer and respectively provide media delivery and distribution function and media resource control function. MRBF makes decisions on media distribution and delivery and MRFC controls MRFP to implement actual media distribution and delivery process.

MRFP is located in the transport layer and implements distribution, delivery and processing of media under the control of MRFC. In an IMS-based IPTV system, MRFP supports distribution storage and delivery transmission of specified streaming media contents under the control of MRFC. MRFP may be a media server in traditional IPTV system. Depending on deployment locations of MRFP in a network, MRFP may be a central media server or edge media server for providing actual streaming media contents. For the distribution process, MRFP may acquire streaming media contents from the content source and stores the streaming media contents under the control of MRFC through content distribution by MRBF.

For the delivery process, MRBF may redirect user terminal's request for streaming media contents to the optimal MRFP under specified policy and MRFP finally provides the streaming media contents for the user terminal.

Particularly, MRFP may implement the following functions: acquisition and storage of streaming media contents in various manners to realize rapid retrieval of stored streaming media contents; reporting of specified information such as load state, resources state and streaming media contents state based on requirements of MRFC; processing of streaming media format such as coding decoding format conversion, video content compaction and video content mixing; distribution of streaming media contents in a plurality of manners to realize conversion among different distribution manners; streaming media content encryption function for real-time encryption of streaming media contents with specified keys.

The control layer in FIG. 9 mainly implements management of IPTV service sessions. In the IMS-based IPTV system, the control layer entirely adopts the control layer architecture in IMS except that some enhancements are made and new requirements are proposed for existing function entities such as CSCF, CF, UPSF and MRFC and a new function entity MRBF is added depending on implementation characteristics and capabilities of IPTV services.

MRBF implements searching, locating, distributing of media resources and controlling of resource policy such as media resource status information in the entire network or certain management domain. MRBF controls delivery and distribution of media, determines distribution of contents according to certain policies and distributes streaming media contents from content sources to MRFP by controlling MRFC via MRFC. MRBF acquires media issuing status information by interacting with MRFC and determines the MRFP to deliver on the basis of the media issuing status information and implements delivery by controlling MRFP via MRFC. MRBF mainly has the following functions: collecting media resource status information such as available resource status, load status, QoS and available bandwidth from MRFC; selecting suitable MRFP from media distribution information acquired by CMF and load status of media distribution points collected by MRFC according to a request from AS/S-CSCF, the request from AS/S-CSCF being included streaming media content identification, user access location or IP address, user terminal type and QoS requirements; routing media resource request message from AS/S-CSCF to MRF, and at the same time selecting exiting subsequent interaction between AS/S-CSCF and MRF according to routing policies; there may be an interface between MRBF and AS and/or S-CSCF.

In the IMS-based IPTV system, MRFC may further have the following functions in addition to functions in the original IMS: controlling MRFP to acquire streaming media contents and controlling the process of distributing streaming media contents from the content source to MRFP; controlling MRFP to implement delivery of streaming media contents, implementing control over various different delivery modes and controlling switching between unicast and multicast; controlling MRFP to implement processing of media formats such as controlling media format conversion, controlling video compaction and controlling video mixing; controlling MRFP to perform real-time encryption of streaming media contents; acquiring streaming media contents distribution information, load status, QoS and network information of MRFP and providing the information to MRBF; supporting media interaction control protocol such as realtime stream protocol (RTSP) and implementing functions of RTSP service side; media interaction control proxy function for implementing functions of RTSP client.

The control layer of FIG. 9 may also have charging function for providing various charging manners such as online/offline charging, charging based on session, charging based on events, charging based on network resource occupation for LTV, VOD services in IPTV system.

UPSF may be provided in FIG. 9, and UPSF may be the central data server of the streaming media network system for storing relevant information of all users. In IPTV system, UPSF may store IPTV service profile information of users.

The application layer in FIG. 9 is critical for IPTV service implementation, and may include two parts: IPTV service enabler and IPTV application.

The IPTV service enabler is a specific function necessary for implementing IPTV services, which is above IMS control layer and under IPTV application layer. The implementation of IPTV services depends on many specific functions such as service implementation capability (unicast/multicast), service identifying, streaming media content meta information management, streaming media content deployment, program guide management, secure copyright protection, equipment capability management, context management and if these specific capabilities are abstracted as different service enabler to be called by session control and application, IPTV service may be implemented. These service enablers may include: service provisioning function (SPF) entity, service control function (SCF) entity for controlling IPTV services, device profile function (DPF) entity for storing user terminal capabilities, context manager (CM) for implementing context management and streaming media content protection function (CPF) entity for implementing streaming media content support function.

SPF may include a service discovery function (SDF) unit for implementing service discovery and selecting functions, a program guide function (PGF) unit for managing program guide, a service scheduler function (SSF) unit for implementing service scheduling and a streaming media content meta information management function (CMF) unit for implementing streaming media content management.

Figure 10:
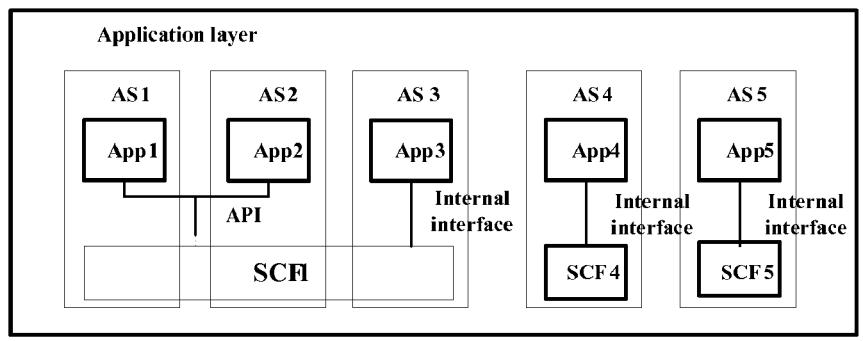
FIG. 10 is a schematic diagram showing that SCF in FIG. 9 is used by IPTV application.

SCF may control basic capability of IPTV services. SCF is a key service enabler for implementing IPTV services located between IMS control layer and IPTV application layer and is a connection control entity between session control and application which may provide basic service control capability and streaming media content delivery control capability for different IPTV applications. Basic service control capability of SCF mainly refers to session control capability for unicast/multicast which is necessary for implementing IPTV services and different services may share these session control capability. For the content delivery control capability of SCF, SCF may acquire content metadata and content source location information from CMF and determine the content to be delivered according to user's context and implement delivery through MRBF and MRF, the user's context being for example user habits and credit grades. What the SCF provides are all necessary basic capabilities for implementing IPTV services and SCF may combine with different IPTV applications as different IPTV AS, for example, combining with SIP IPTV Application as SIP IPTV AS. In practical network deployment, SCF may be used by a plurality of IPTV applications as one independent entity. In addition, a certain AS may also construct SCF by itself. FIG. 10 is a diagram showing that SCF is used by IPTV application. As shown in FIG. 10, AS1, AS2 and AS3 use a common SCF function. Interfaces among App1, App2 and SCF1 are application program interface (API) and interface between App3 and SCF1 is an internal interface. AS4, AS5 implement SCF function by themselves and interfaces between APP4 and SCF4 and between APP5 and SCF5 are internal interfaces.

SPF provides necessary service capabilities related to IPTV services, which is a set of multiple service capabilities and includes service discovery, service scheduling, streaming media content meta information management and program guide.

SDF provides service discovery, selectable service functions for IPTV services, e.g. providing program information of electronic program guide (EPG) system to users. If there is a plurality of EPG servers, for example different service providers or third party service providers (if there are independent EPG servers for third party services), the EPG access points are integrated.

PGF provides service browsing and search engine functions and provides interactive interface of program requesting, live broadcast and broadcasting in turn for users, i.e. implementing generation function of EPG SSF performs deployment and organization of IPTV services. SSF has the following functions. For multicasting services, primary functions of service deployment are allocation and management of multicasting addresses, association of program identification (ID) and multicasting addresses, establishment of multicasting and control over multicasting sources; for program requesting services, primary functions of service deployment are association of metadata and content identifier (CID), triggering of content distribution and deciding content distribution policy.

PGF may obtain necessary service information for generating electronic program guide (including unicast and multicast) from service deployment and organization information, and also support static service deployment and dynamic service deployment during service requesting process.

CMF implements management of streaming media content meta information. Here the streaming media content meta information refers to contents prior to distribution, therefore the management by CMF refers to the management prior to streaming media contents distribution and doesn't involve streaming media contents posterior to distribution. The streaming media content meta information includes content identification, content metadata and content source location information. The content identification is the unique reference identification of all contents or channels the IPTV system can provide. The content metadata includes description of contents or channels such as brief introduction of contents, channel description and media formats. The content source location information may point to concentrated storage location of service providers themselves, or certain storage address from content providers or media port information from live broadcast content providers. CMF may support functions of adding, deleting, modifying and inquiring contents from other function entities. CMF may further receive content update notifications from content providers, receive metadata and source location information therein, generate content identification for new streaming media contents and perform mapping among the content identifications, content metadata and the content source location information. In addition, the content provider may have content management entity that may interact with CMF through specific protocol e.g. SIP or HTTP.

CM may implement functions of collecting, storing, organizing and transmitting context information, for example, collecting relevant information from different information sources, transmitting required information to different applications. It should be noted that all information that affect implementation of IPTV services may be stored and managed as context. Context is generally classified into three kinds: user context, network context and content context. The user context may include information on user terminal currently used by a user, access network to which the user attaches, user location information, user terminal presence information, and current service information. The network context may include information on forwarding network, information on network entities that must be passed for establishing IPTV services such as core network's support for multicasting and bandwidth of access network. The content context may include content class, content permission and degree of popularity.

CPF may provide copyright security protection mechanism for streaming media contents delivered in IPTV services to prevent piracy of contents. CPF may adopt a plurality of mechanisms such as DRM, CA and service layer protection. CPF may generate streaming media content keys and may also generate and manage right objects. The streaming media content keys may include content protection key and service protection key.

DPF may store capability information of user terminals such as screen size, resolution, battery electric quantity, memory usage, which is enhanced information necessary for implementing IPTV services and enables upper services to better understand capabilities of user terminals and real time status information and conducts service presentation adjustment accordingly in combination with specific applications. User terminals may establish interacting mechanism with DPF to implement realtime update of equipment capability information. DPF may be more than just a database. In addition to information collecting and storing functions, DPF may further implement active reporting of information according to requirements of upper layer applications given that set conditions are satisfied to alleviate inquiry loads of upper application. For example, the upper application issues policies to DPF and DPF performs collecting, organizing and reporting of user terminal's information according to the policies.

Figure 11:
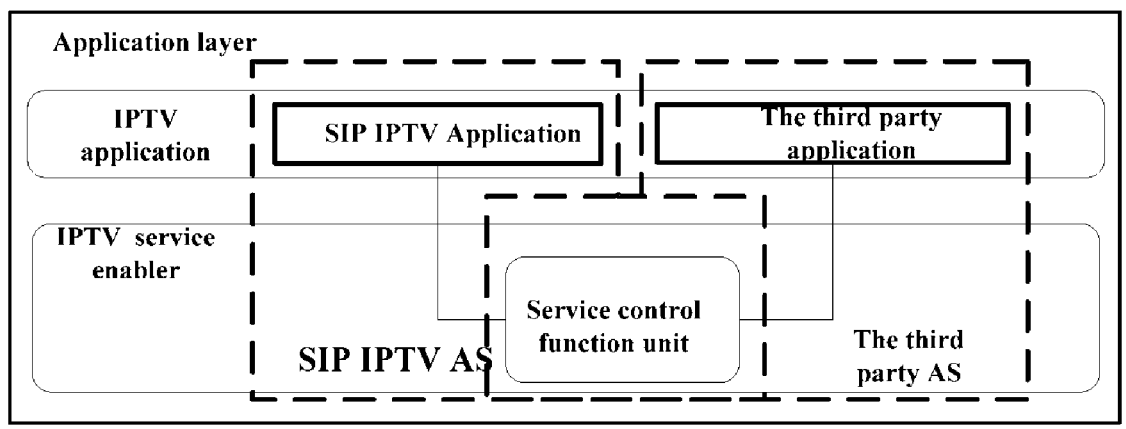
FIG. 11 is a schematic structural representation of IPTV AS in FIG. 9.

IPTV application may be independent of service enablers for implementing logic control over IPTV services and may perform specific service capabilities through the service enablers. IPTV application may constitute IPTV AS together with SCF to implement IPTV services. A structure of IPTV AS is shown in FIG. 11. In particular, IPTV application may include SIP IPTV application and third party application. SIP IPTV application and SCF constitute SIP IPTV AS and the interface therebetween is an internal interface such as ISC. SIP IPTV application and SCF may interact via SIP to implement basic services of IPTV services. Generally, SIP IPTV AS may be regarded as a part of IPTV system. The third party application and SCF constitute a third party AS with API as the interface therebetween. The third party application may interact with IMS by the API provided by SCF and may call SCF function via API to implement third party IPTV value added service.

It should be noted that in above-mentioned all embodiments, all or part functions of MRFC may be implemented independently of MRFC's function entities and such function entities and MRFC may be generally called as media resource control function entity. Similarly, all or part functions of MRFP may be implemented independently of MRFP's function entities and such function entities and MRFP may be generally called as media resource delivery processing function entity.

In embodiments of the present invention, carrying out different service logics in AS may provide rich services for UEs, including basic streaming media services and various value added services and individualized services in combination with streaming media, while processing mechanisms such as session control, routing, service triggering, user authentication and management manner, charging, guarantee of quality of service and multicasting control of all these services are identical.

The streaming media network system according to embodiments of the present invention may effectively manage program contents, distribute contents according to predetermined policies and transfer the same to UE securely, while UE may also enjoy streaming media service by intuitive program interaction.

The streaming media network system according to embodiments of the present invention provides streaming media services on the basis of existing IMS network architecture and share developed functions of IMS network architecture such as user management, authentication, charging, session routing and service triggering, thereby reducing the operation cost of carriers. Further, the embodiments of the present invention can provide richer multimedia services that are combination of realtime session type and TV type services for UE under the centrally session control of IMS network architecture, for example, inviting a friend via telephone to watch ordered TV program together and conducting control operations such as realtime comments, pausing and playing back on the program during watching.

The invention claimed is:

1. A streaming media network system, comprising:
   an application server, comprising a non-transient computer readable medium configured to send a media resource request and to provide a user terminal with information regarding a media resource delivery processing function entity which stores streaming media content;
   wherein the information regarding the media resource delivery processing function entity is provided by a media server; and
   wherein the system further comprises: a media resource location function entity (MRLF) or a media resource broker entity function entity (MRBF); the MRLF or the MRBF is configured to select one media server providing the streaming media content from one or more media servers.

2. The streaming media network system of claim 1, wherein the MRLF or MRBF is further configured to collect or inquire distribution information of at least one of the streaming media content on one or more media servers or status of the one or more media servers.

3. The streaming media network system of claim 2, wherein the MRLF or the MRBF is included in the application server.

4. The streaming media network system of claim 1, wherein the media server provides streaming media content by interacting with other media servers, and the interacting is P2P.

5. The streaming media network system of claim 1, wherein the media server comprises a media resource control function entity and a media resource delivery processing function entity, the media resource control function entity controls one or more media resource delivery processing function entity, and the media resource delivery processing function entity stores the streaming media contents.

6. The streaming media network system of claim 5, wherein the media resource control function entity selects the media resource delivery processing function entity providing the streaming media content to the user terminal.

7. An application server, comprising a non-transient computer readable medium configured to perform the method comprising:
sending a media resource request; and
providing a user terminal with information regarding a media resource delivery processing function entity which stores streaming media content; and
selecting one media server providing the streaming media content from one or more media servers;
wherein the information regarding the media resource delivery processing function entity is provided by the selected media server.

8. An apparatus, comprising a non-transient computer readable medium configured to perform the method comprising:
collecting streaming media content distribution information and load status information of one or more media resource delivery processing function eintities;
selecting one media resource delivery processing function entity providing the streaming media content from the one or more media resource delivery processing function entities; and
routing request messages from an application server (AS) or a service-call session control function (S-CSCF) to a media resource control function entity.

9. A streaming media service realization method, comprising:
receiving, by an application server, a streaming media service request from a user terminal;
transmitting, by the application server, a media resource request to a media server; wherein the media server is selected from one or more media servers by a media resource location function entity (MRLF) or a media resource broker entity function (MRBF);
receiving, by the application server, information regarding a media resource delivery processing function entity storing streaming media contents from the media server;
providing, by the application server, the information on the media resource delivery processing function entity to the user terminal.

10. The streaming media service realization method of claim 9, wherein the method further comprises: acquiring, by the user terminal, program information from a streaming media service enabler, before the user terminal initiates the streaming media service request.

11. The streaming media service realization method of claim 9, wherein the method further comprises: acquiring, by the application server, the streaming media content meta information from a streaming media service enabler, when the application server processes the streaming media service request.

12. The streaming media service realization method of claim 9, wherein sending, by the application server, the media resource request comprises:
sending, by the application server, the media resource request to a media resource control function entity in the media server;
selecting, by the media resource control function entity, one media server from at least one media servers; and
forwarding, by the media resource control function entity, the media resource request to the selected media server.

* * * * *